US012763439B2

(12) United States Patent
Lee et al.

(10) Patent No.: US 12,763,439 B2
(45) Date of Patent: Oct. 13, 2026

(54) SECONDARY BATTERY

(71) Applicant: Samsung SDI Co., Ltd., Yongin-si (KR)

(72) Inventors: Ho Jae Lee, Yongin-si (KR); Dae Kyu Kim, Yongin-si (KR); Hyun Ki Jung, Yongin-si (KR); Myung Seob Kim, Yongin-si (KR); Won Sug Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 681 days.

(21) Appl. No.: 18/014,071

(22) PCT Filed: Feb. 7, 2022

(86) PCT No.: PCT/KR2022/001828

§ 371 (c)(1),
(2) Date: Mar. 8, 2023

(87) PCT Pub. No.: WO2022/196938

PCT Pub. Date: Sep. 22, 2022

(65) Prior Publication Data

US 2023/0268620 A1 Aug. 24, 2023

(30) Foreign Application Priority Data

Mar. 18, 2021 (KR) ........................ 10-2021-0035285

(51) Int. Cl.
*H01M 50/533* (2021.01)
*H01M 50/107* (2021.01)
(Continued)

(52) U.S. Cl.
CPC ....... *H01M 50/533* (2021.01); *H01M 50/107* (2021.01); *H01M 50/152* (2021.01); *H01M 50/538* (2021.01)

(58) Field of Classification Search
CPC ............. H01M 50/533; H01M 50/107; H01M 50/538; H01M 50/152
(Continued)

(56) References Cited

U.S. PATENT DOCUMENTS 7,687,189 B2 3/2010 Wu et al.
7,824,790 B2 11/2010 Wu et al.
(Continued)

FOREIGN PATENT DOCUMENTS

CN 2833899 Y 11/2006
CN 202601763 U 12/2012
(Continued)

OTHER PUBLICATIONS

International Search Report for PCT Application No. PCT/KR2022/001828 dated May 23, 2022, 3 pages.
(Continued)

*Primary Examiner* — Anca Eoff
*Assistant Examiner* — Omar M Kekia
(74) *Attorney, Agent, or Firm* — Womble Bond Dickinson (US) LLP

(57) ABSTRACT

The present invention relates to a secondary battery capable of reducing costs and increasing capacity. For example, disclosed is a secondary battery characterized by comprising: an electrode assembly including a first electrode, a second electrode, and a separator; a case accommodating the electrode assembly; and a cap assembly coupled to the upper portion of the case, wherein the first electrode comprises: a first current collector; a first current collecting tab structure extending from the first current collector and having a plurality of bent current collection parts; and a first lead tab electrically connected to the first current collecting tab structure, wherein, in the first current collecting tab structure, the width of the current collection parts increases from
(Continued)

the center of the electrode assembly to the outside, and the distance between the current collection parts increases.

9 Claims, 8 Drawing Sheets

(51) Int. Cl.
*H01M 50/152* (2021.01)
*H01M 50/538* (2021.01)

(58) Field of Classification Search
USPC ........................................................ 429/94
See application file for complete search history.

(56) References Cited

U.S. PATENT DOCUMENTS

| | | | |
|---|---|---|---|
| 7,833,647 | B2 | 11/2010 | Martinson et al. |
| 7,923,138 | B2 | 4/2011 | Wu et al. |
| 8,173,284 | B2 | 5/2012 | Wu et al. |
| 12,074,270 | B2 | 8/2024 | Park et al. |
| 12,166,217 | B2 | 12/2024 | Park et al. |
| 12,166,230 | B2 | 12/2024 | Jeong et al. |
| 2005/0244706 | A1 | 11/2005 | Wu et al. |
| 2005/0287432 | A1* | 12/2005 | Cheon ............... H01M 10/0431 429/211 |
| 2006/0228620 | A1 | 10/2006 | Martinson et al. |
| 2008/0213651 | A1 | 9/2008 | Wu et al. |
| 2010/0124694 | A1* | 5/2010 | Hikata ................ H01M 50/528 29/730 |
| 2011/0014507 | A1 | 1/2011 | Wu et al. |
| 2011/0183164 | A1 | 7/2011 | Wu et al. |
| 2020/0343520 | A1 | 10/2020 | Jeong et al. |
| 2021/0160357 | A1* | 5/2021 | Kim .................... H01M 50/574 |
| 2021/0344033 | A1 | 11/2021 | Park et al. |
| 2022/0131216 | A1 | 4/2022 | Park et al. |
| 2024/0387857 | A1 | 11/2024 | Park et al. |

FOREIGN PATENT DOCUMENTS

| | | | |
|---|---|---|---|
| CN | 109671987 | A | 4/2019 |
| CN | 209675432 | U | 11/2019 |
| CN | 111788715 | A | 10/2020 |
| JP | 2005-190685 | A | 7/2005 |
| JP | 2007-265846 | A | 10/2007 |
| JP | 4401634 | B2 | 1/2010 |
| JP | 4586339 | B2 | 11/2010 |
| JP | 5504250 | B2 | 5/2014 |
| JP | 2016-115409 | A | 6/2016 |
| JP | 6045286 | B2 | 12/2016 |
| KR | 10-0515832 | B1 | 9/2005 |
| KR | 10-2016-0009406 | A | 1/2016 |
| KR | 10-1743136 | B1 | 6/2017 |
| KR | 10-2020-0041625 | A | 4/2020 |
| KR | 10-2020-0094453 | A | 8/2020 |

OTHER PUBLICATIONS

Extended European Search Report issued in corresponding EP Application No. 22771604.0, dated Jul. 3, 2025 (12 pages).
Korean Office Action corresponding to KR Application No. 10-2021-0035285, dated Oct. 10, 2025 (6 pages).
Chinese Notification of First Office Action, for Patent Application No. 202280021019.7, dated Jun. 23, 2026, 10 pages.

* cited by examiner

SECONDARY BATTERY

CROSS-REFERENCE TO RELATED APPLICATIONS

This application is a U.S. National Phase Patent Application of International Application Number PCT/KR2022/001828, filed on Feb. 7, 2022, which claims priority to Korean Patent Application Number 10-2021-0035285, filed on Mar. 18, 2021, the entire content of each of which is incorporated herein by reference.

TECHNICAL FIELD

The present invention relates to a secondary battery.

BACKGROUND ART

Unlike a primary battery that cannot be charged, a secondary battery is a rechargeable and dischargeable battery. A low-capacity secondary battery may be used for various portable small-sized electronic devices, such as a smartphone, a feature phone, a notebook computer, a digital camera, or a camcorder, and a high-capacity secondary battery is widely used as a power source for motor drives, such as those in hybrid vehicles or electric vehicles. These lithium ion secondary batteries may be classified into cylindrical, prismatic, and pouch-type secondary batteries in terms of shape.

Specifically, a cylindrical lithium secondary battery generally includes a cylindrical electrode assembly, a cylindrical case to which the electrode assembly is coupled, an electrolyte injected into the case to allow movement of lithium ions, and a cap assembly that is coupled to one side of the case to prevent leakage of the electrolyte solution and prevents separation of the electrode assembly.

The above information disclosed in this Background section is only for enhancement of understanding of the background of the invention and therefore it may contain information that does not constitute prior art.

DESCRIPTION OF EMBODIMENTS

Technical Problem

The present invention provides a secondary battery capable of reducing costs and increasing capacity.

Solution to Problem

A secondary battery according to the present invention may include: an electrode assembly including a first electrode, a second electrode, and a separator; a case accommodating the electrode assembly; and a cap assembly coupled to the upper portion of the case, wherein the first electrode comprises: a first current collector; a first current collecting tab structure extending from the first current collector and having a plurality of bent current collection parts; and a first lead tab electrically connected to the first current collecting tab structure, wherein, in the first current collecting tab structure, the width of the current collection parts increases from the center of the electrode assembly to the outside, and the distance between the current collection parts increases.

In the first current collecting tab structure, the heights of the current collection parts may increase toward the outside from the center of the electrode assembly.

The current collection parts may be bent toward the center of the electrode assembly.

In the first current collecting tab structure, the current collection parts are arranged in a straight line and have a fan shape.

An angle formed by the first current collecting tab structure with respect to the center of the electrode assembly may be 90 degrees to 180 degrees.

The current collection parts include a plurality of current collecting tabs.

In the first current collecting tab structure, the current collection parts may be arranged diagonally.

The first lead tab is electrically connected to the cap assembly.

The second electrode may include a second current collector, a second current collecting tab structure having a plurality of current collection parts extended from and bent from the second collector, and a second lead tab electrically connected to the second current collecting tab structure, and in the second current collecting tab structure, the widths of the current collection parts may increase, the heights of the current collection parts may increase, and the distance between the current collection parts may increase from the center of the electrode assembly to the outside.

The second lead tab may be electrically connected to the case.

Advantageous Effects of Invention

The secondary battery according to an embodiment of the present invention includes a current collecting tab structure including a plurality of current collecting tabs and a lead tab connecting the current collecting tabs, and thus a relatively expensive current collector plate is not used, thereby reducing costs accordingly, and the inner space is highly utilized, thereby increasing the capacity of electrode assembly.

BEST MODE

Hereinafter, a preferred embodiment of the present invention will be described in detail with reference to the accompanying drawings.

Examples of the present invention are provided to more completely explain the present invention to those skilled in the art, and the following examples may be modified in various other forms. The present invention, however, may be embodied in many different forms and should not be construed as being limited to the example (or exemplary) embodiments set forth herein. Rather, these example embodiments are provided so that this invention will be thorough and complete and will convey the aspects and features of the present invention to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms "comprise" and/or "comprising," when used in this specification, specify the presence of stated features, numbers, steps, operations, elements, and/or components, but do not preclude the presence or addition of one or more other features, numbers, steps, operations, elements, components, and/or groups thereof.

Figure 1:
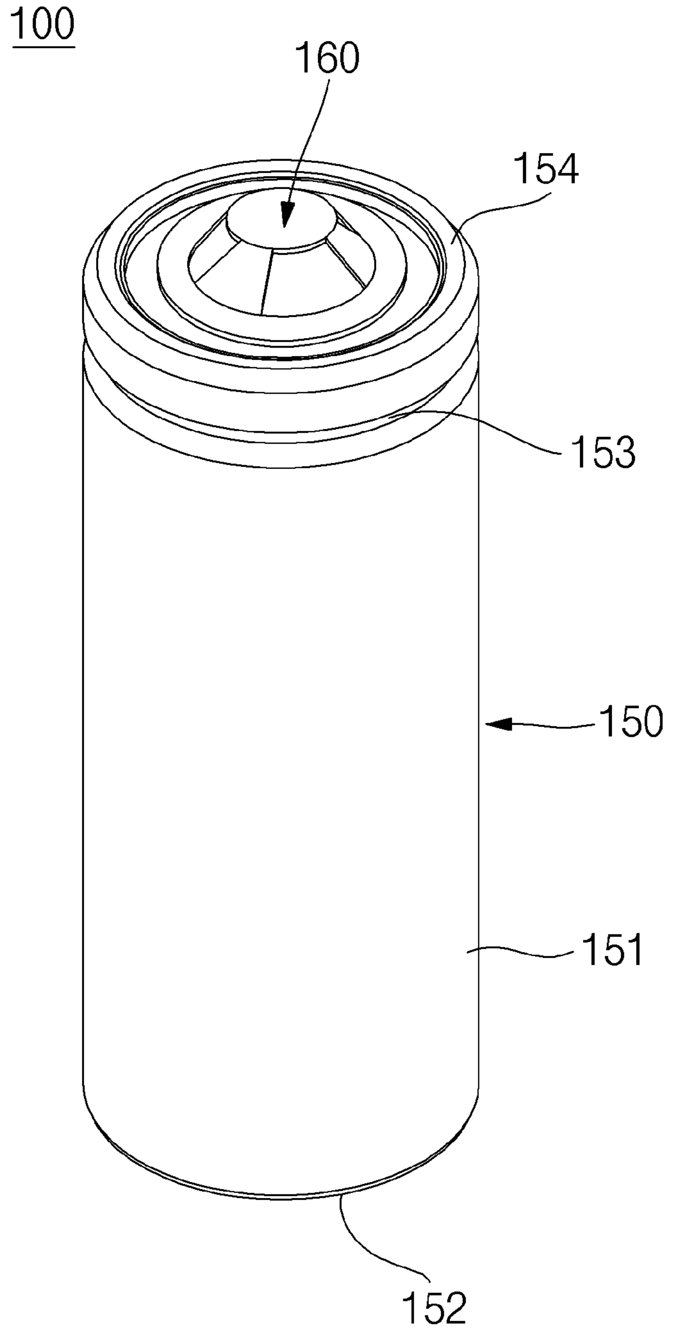
FIG. 1 is a perspective view illustrating a secondary battery according to an embodiment of the present invention.
Figure 2:
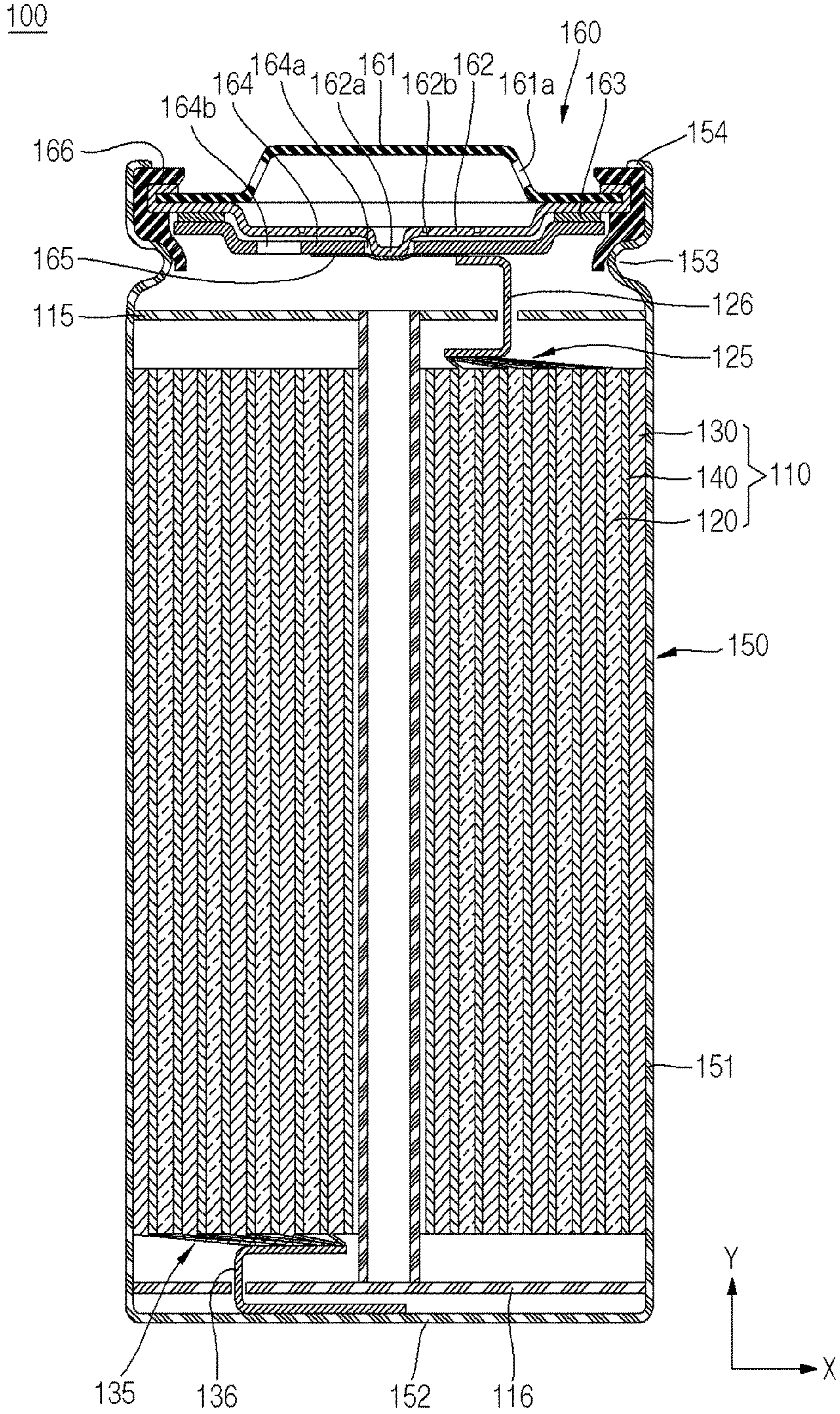
FIG. 2 is a cross-sectional view illustrating a secondary battery according to an embodiment of the present invention.
Figure 3:
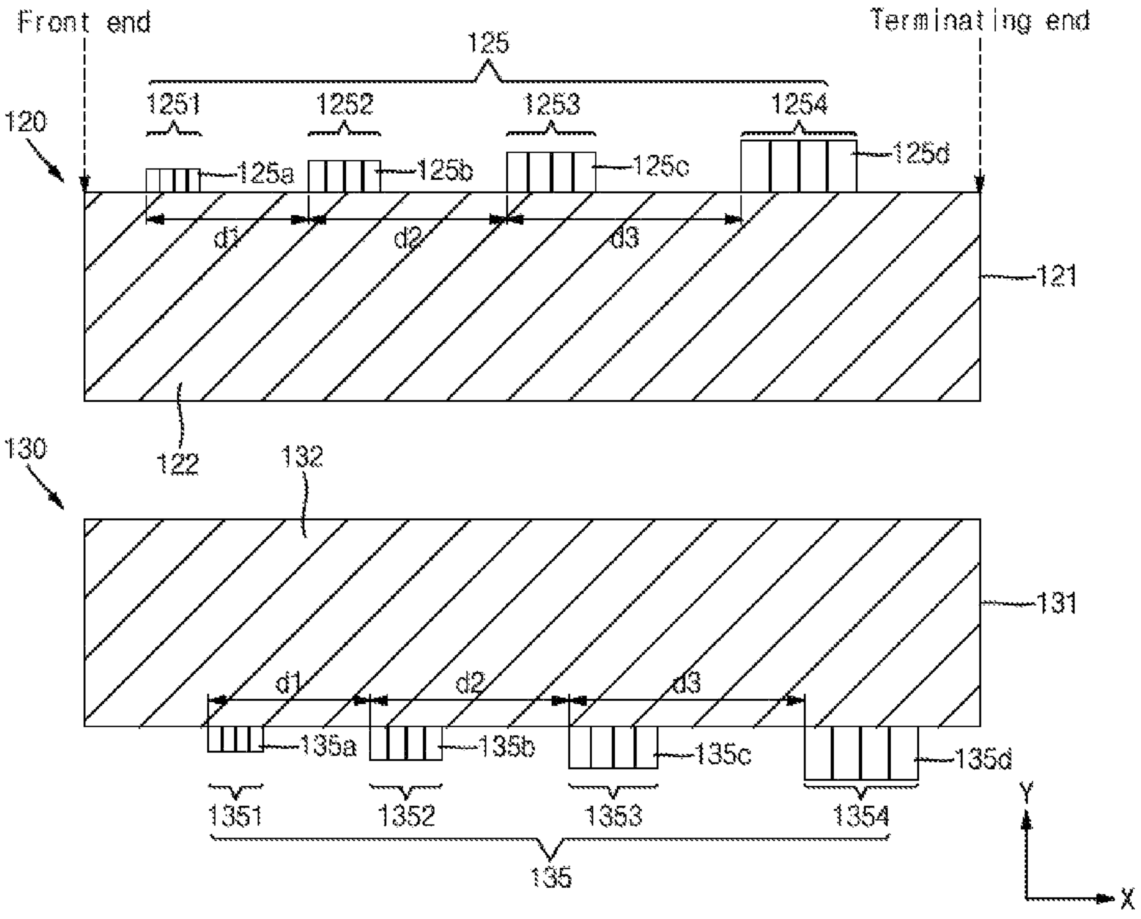
FIG. 3 is a plan view illustrating a first electrode and a second electrode of an electrode assembly according to an embodiment of the present invention.
Figure 4:
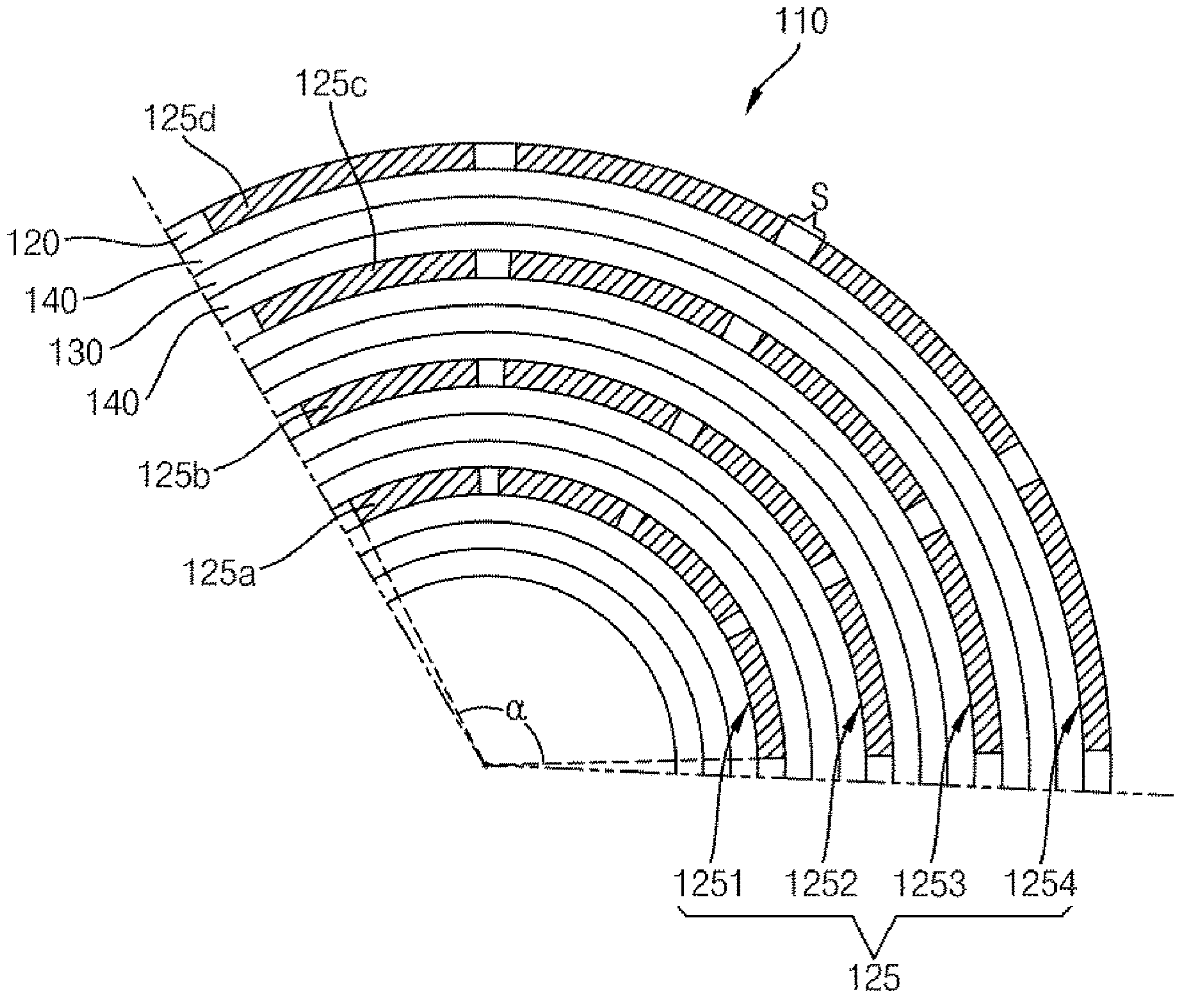
FIG. 4 is a plan view illustrating the electrode assembly of FIG. 2.

FIG. 1 is a perspective view illustrating a secondary battery according to an embodiment of the present invention. FIG. 2 is a cross-sectional view illustrating a secondary battery according to an embodiment of the present invention. FIG. 3 is a plan view illustrating a first electrode and a second electrode of an electrode assembly according to an embodiment of the present invention. FIG. 4 is a plan view illustrating the electrode assembly of FIG. 2.

Referring to FIGS. 1 and 2, a secondary battery 100 according to an embodiment of the present invention includes an electrode assembly 110, a case 150, and a cap assembly 160.

The electrode assembly 110 includes a first electrode 120, a second electrode 130, and a separator 140 interposed between the first electrode 120 and the second electrode 130. In the electrode assembly 110, a laminate of the first electrode 120, the second electrode 130, and the separator 140 may be wound in a jelly-roll shape. Here, the first electrode 120 may act as an anode, and the second electrode 130 may act as a cathode. Of course, the reverse is also possible.

The first electrode 120 may include a first current collector 121 made of a metal foil such as aluminum, a first active material layer 122 formed on both surfaces of the first current collector 121 and coated with a first active material, a first current collecting tab structure 125 electrically connected to the first collector 121, and a first lead tab 126 electrically connected to the first current collecting tab structure 125.

Referring to FIG. 3, the first current collecting tab structure 125 may protrude in a second direction Y perpendicular to the first direction X (or longitudinal direction) of the first collector 121. The first current collecting tab structure 125 may protrude upward from the electrode assembly 110. The first current collecting tab structure 125 may include a plurality of current collection parts 1251, 1252, 1253, and 1254. In some examples, the first current collecting tab structure 125 may include a first current collection part 1251, a second current collection part 1252, a third current collection part 1253, and a fourth current collection part 1254. Although the first current collecting tab structure 125 including four current collection parts is illustrated, the first current collecting tab structure 125 may include four or more current collection parts. The first current collection part 1251 may be located at the winding end side of the first current collector 121, and the fourth current collection part 1254 may be located at the winding end side.

Each of the current collection parts 1251, 1252, 1253, and 1254 of the first current collecting tab structure 125 may include a plurality of current collecting tabs 125*a*, 125*b*, 125*c*, and 125*d*, respectively. Although the current collection parts 1251, 1252, 1253, and 1254 each including four current collecting tabs are illustrated, the respective current collection parts 1251, 1252, 1253, and 1254 may include four or more or four or less current collecting tabs. Here, each of the current collecting tabs 125*a*, 125*b*, 125*c*, and 125*d* constituting each current collection part 1251, 1252, 1253, and 1254 may have the same size as each other. In some examples, the first current collection part 1251 of the first current collecting tab structure 125 may include four current collecting tabs 125*a*. The current collecting tabs 125*a* of the first current collection part 1251 may be spaced apart from each other. In addition, the current collecting tabs 125*a* of the first current collection part 1251 may have the same width and the same height. The current collecting tabs 125*b* of the second current collection part 1252 may be spaced apart from each other and may have the same width and the same height. Here, the size (width or height) of the current collecting tab 125*b* of the second current collection part 1252 may be different from the size (width or height) of the current collecting tab 125*a* of the first current collection part 1251. The current collecting tabs 125*c* of the third current collection part 1253 may be spaced apart from each other and may have the same width and the same height. The size of the current collecting tab 125*c* of the third current collection part 1253 may be different from the size of the current collecting tab 125*b* of the second current collection part 1252. The current collecting tabs 125*d* of the fourth current collection part 1254 may be spaced apart from each other and may have the same width and the same height. The size of the current collecting tab 125*d* of the fourth current collection part 1254 may be different from the size of the current collecting tab 125*c* of the third current collection part 1253.

In some examples, the current collecting tabs 125*a*, 125*b*, 125*c*, and 125*d* may be formed by punching (or cutting) one end of the first current collector 121 in the second direction Y. The current collecting tabs 125*a*, 125*b*, 125*c*, and 125*d* may be part of the first collector 121. In other words, the current collecting tabs 125*a*, 125*b*, 125*c*, and 125*d* may be portions extending from the first current collector 121.

In the first current collecting tab structure 125, the current collecting tabs 125*a*, 125*b*, 125*c*, and 125*d* of each current collection part 1251, 1252, 1253, 1254 may gradually increase in width and gradually increase in height from the winding-front end to the winding-terminating end. Here, the width represents the length in the first direction (X), and the height represents the length in the second direction (Y). In some examples, the width of the current collecting tab 125*b* of the second current collection part 1252 may be greater than that of the current collecting tab 125*a* of the first current collection part 1251. In addition, the height of the current collecting tab 125*b* of the second current collection part 1252 may be greater than that of the current collecting tab 125*a* of the first current collection part 1251. The width of the current collecting tab 125*c* of the third current collection part 1253 is greater than that of the current collecting tab 125*b* of the second current collection part 1252, and the height of the current collecting tab 125*c* of the third current collection part 1253 may be greater than that of the current collecting tab 125*b* of the second current collection part 1252. The width of the current collecting tab 125*d* of the fourth current collection part 1254 is greater than that of the current collecting tab 125*c* of the third current collection part 1253, and the height of the current collecting tab 125*d* of the fourth current collection part 1254 may be greater than that of the current collecting tab 125*c* of the third current collection part 1253.

Referring to FIGS. 3 and 4, when forming the electrode assembly 110, the first current collecting tab structure 125 is spaced apart at regular intervals, and thus the respective current collection parts 1251, 1252, 1253, and 1254 are aligned in the same position. Accordingly, as shown in FIG. 4, a slit s between each of the current collecting tabs 125*a*, 125*b*, 125*c*, and 125*d* spaced apart from each other may be in a straight line shape. In addition, in the first current collecting tab structure 125, the intervals of the current collection parts 1251, 1252, 1253, and 1254 may gradually increase from the winding-front end to the winding-terminating end. This is because the current collection parts 1251, 1252, 1253, and 1254 can be aligned on the same line only when the interval therebetween is increased since the thickness of the electrode assembly 110 gradually increases as the first electrode 120, the separator 140, and the second electrode 130 are wound together, that is, as the number of winding increases. For example, a distance d2 between the second current collection part 1252 and the third current collection part 1253 may be greater than a distance d1 between the first current collection part 1251 and the second current collection part 1252. In addition, a distance d3 between the third current collection part 1253 and the fourth current collection part 1254 may be greater than the distance d2 between the second current collection part 1252 and the third current collection part 1253. In addition, the second current collection part 1252 may completely overlap the first current collection part 1251, the third current collection part 1253 may completely overlap the second current collection part 1252, and the fourth current collection part 1254 may completely overlap the third current collection part 1253.

In addition, in the first current collecting tab structure 125, each of the current collection parts 1251, 1252, 1253, and 1254 may be bent in one direction to contact each other. In some examples, each of the current collection parts 1251, 1252, 1253, and 1254 is bent in a direction toward the center of the electrode assembly 110 so that neighboring current collection parts 1251, 1252, 1253, and 1254 overlap each other. For example, the first current collection part 1251 may be bent toward the center of the electrode assembly 110, and the second current collection part 1252 may be bent to overlap the first current collection part 1251. In addition, the third current collection part 1253 and the fourth current collection part 1254 may be bent, so that the third current collection part 1253 overlaps the top of the second current collection part 1252, and the fourth current collection part 1254 overlaps the top of the third current collection part 1253. In addition, since each of the current collection parts 1251, 1252, 1253, and 1254 includes a plurality of current collecting tabs 125*a*, 125*b*, 125*c*, and 125*d* spaced apart from each other, it is easy to bend the current collection parts 1251, 1252, 1253, and 1254 toward the center of the electrode assembly 110.

Referring to FIG. 4, the first current collecting tab structure 125 may be densely aligned with a portion of the electrode assembly 110. In some examples, since the width of each of the current collecting tabs 125*a*, 125*b*, 125*c*, and 125*d* increases from the winding-front end to the winding-terminating end of the first current collecting tab structure 125, the electrode assembly 110 may be arranged in a fan shape. Here, an angle $\alpha$ formed by the first current collecting tab structure 125 with respect to the center of the electrode assembly 110 may be 90 degrees to 180 degrees. More preferably, the angle $\alpha$ formed by the first current collecting tab structure 125 with respect to the center of the electrode assembly 110 may be 135 degrees. Here, when the angle $\alpha$ formed by the first current collecting tab structure 125 with respect to the center of the electrode assembly 110 is smaller than 90 degrees, the output of the electrode assembly 110 may be lowered. In addition, when the angle $\alpha$ formed by the first current collecting tab structure 125 with respect to the center of the electrode assembly 110 is greater than 180 degrees, it may be difficult to inject an electrolyte into the electrode assembly 110. In addition, as described above, by making the first current collecting tab structure 125 have a predetermined angle with respect to the center of the electrode assembly 110, a substrate is compacted and overlapped in one direction during welding, thereby improving weldability.

The first lead tab 126 may be attached to the first current collecting tab structure 125. In some examples, the first lead tab 126 may be electrically connected to the plurality of bent current collection parts 1251, 1252, 1253, and 1254 by welding. The first lead tab 126 may electrically connect the electrode assembly 110 and the cap assembly 160. In some examples, one end of the first lead tab 126 may be electrically connected to the first current collecting tab structure 125, and the other end may protrude upward from the electrode assembly 110 and be electrically connected to the cap assembly 160.

The second electrode 130 may include a second current collector 131 made of a metal foil such as copper or nickel, a second active material layer 132 formed on both surfaces of the second current collector 131 and coated with a second active material, a second current collecting tab structure 135 electrically connected to the second current collector 131, and a second lead tab 136 electrically connected to the second current collecting tab structure 135.

The second active material layer 132 may be formed on both surfaces of the second current collector 131. In some examples, the second active material layer 132 may be continuously formed on both surfaces of the second current collector 131.

The second current collecting tab structure 135 may protrude in the second direction Y of the second current collector 131. The second current collecting tab structure 135 may protrude in a direction opposite to that of the first current collecting tab structure 125. In other words, the second current collecting tab structure 135 may protrude from the lower part of the electrode assembly 110. The second current collecting tab structure 135 may have a form corresponding to the first current collecting tab structure 125. However, referring to FIG. 2, the second current collecting tab structure 135 may be located on the opposite side of the first current collecting tab structure 125 on the basis of the first direction X. Accordingly, as shown in FIG. 3, the starting portions of the first current collecting tab structure 125 and the second current collecting tab structure 135 may be different at the winding-front end. The second current collecting tab structure 135 may include a plurality of current collection parts 1351, 1352, 1353, and 1354. In some examples, the second current collecting tab structure 135 may include a first current collection part 1351, a second current collection part 1352, a third current collection part 1353, and a fourth current collection part 1354. The first current collection part 1351 may be located at the winding-front end side of the second current collector 131, and the fourth current collection part 1354 may be located at the winding-terminating end side. Each of the current collection parts 1351, 1352, 1353, and 1354 of the second current collecting tab structure 135 may include a plurality of current collecting tabs 135*a*, 135*b*, 135*c*, and 135*d*. The second current collecting tab structure 135 is the same as the first current collecting tab structure 125 described above, and thus duplicate descriptions will be omitted.

The second lead tab 136 may be attached to the second current collecting tab structure 135. In some examples, the second lead tab 136 may be electrically connected to the plurality of bent current collection parts 1351, 1352, 1353, and 1354 by welding. In addition, the second lead tab 136 may be electrically connected to the lower plate 152 of the case 150. In some examples, one end of the second lead tab 136 may be electrically connected to the second current collecting tab structure 135 and the other end may be electrically connected to the lower plate 152 of the case 150.

The separator 140 is positioned between the first electrode 120 and the second electrode 130 to prevent a short circuit between the first electrode 120 and the second electrode 130 and to enable the movement of lithium ions. The separator 140 may be made of polyethylene, polypropylene, or a composite film of polyethylene and polypropylene.

Figure 5A:
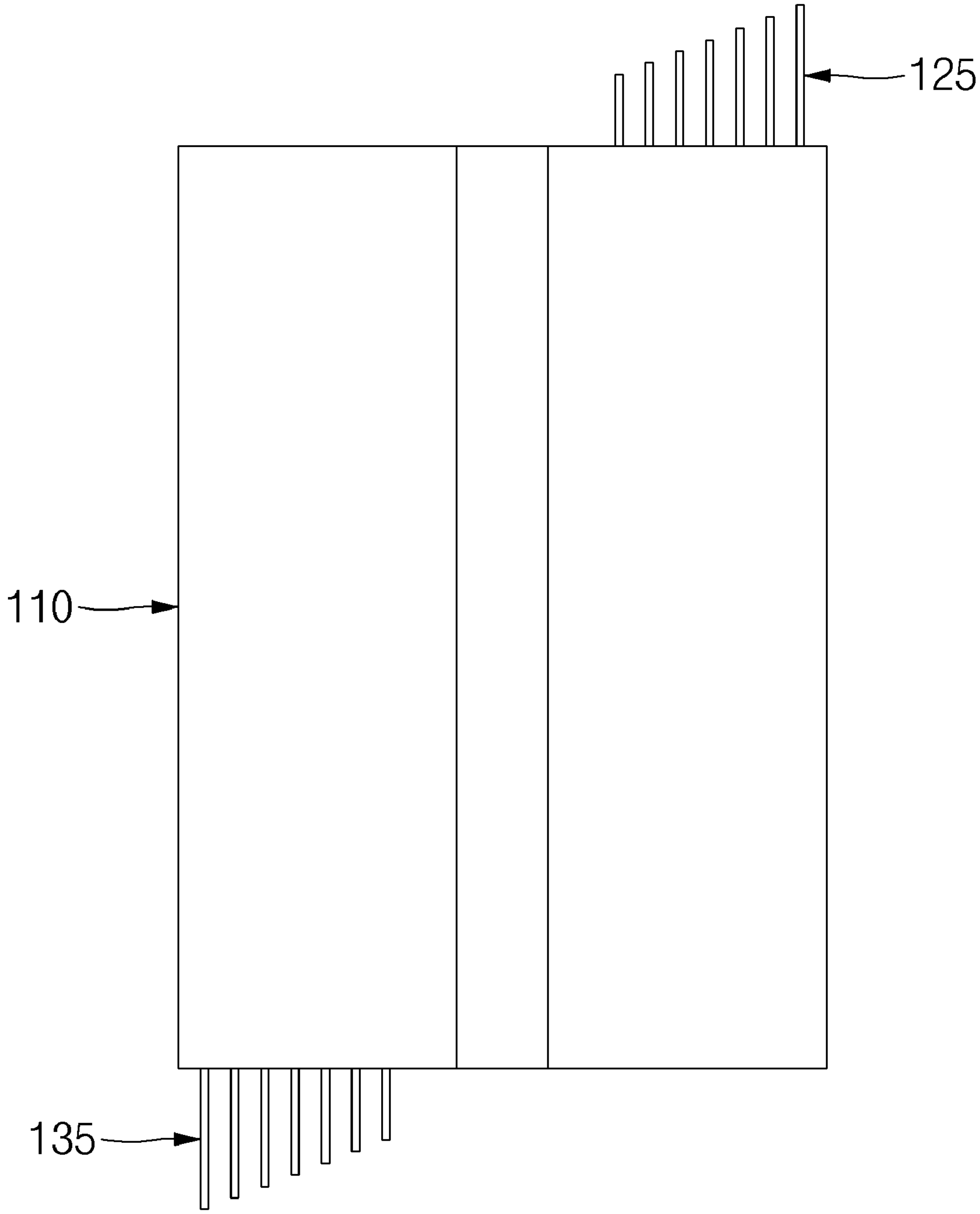
FIGS. 5A to 5C are diagrams illustrating a method for manufacturing an electrode assembly.
Figure 5B:
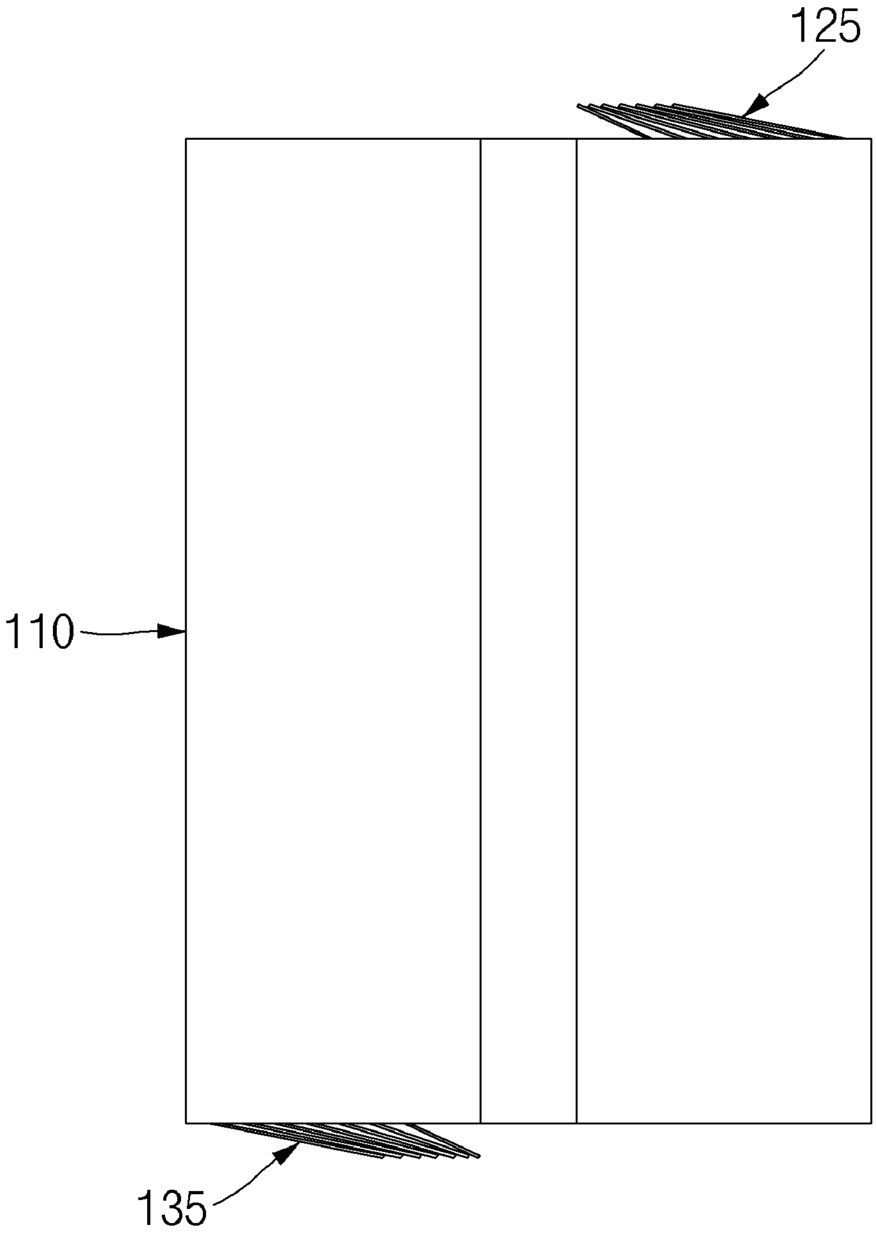
Figure 5C:
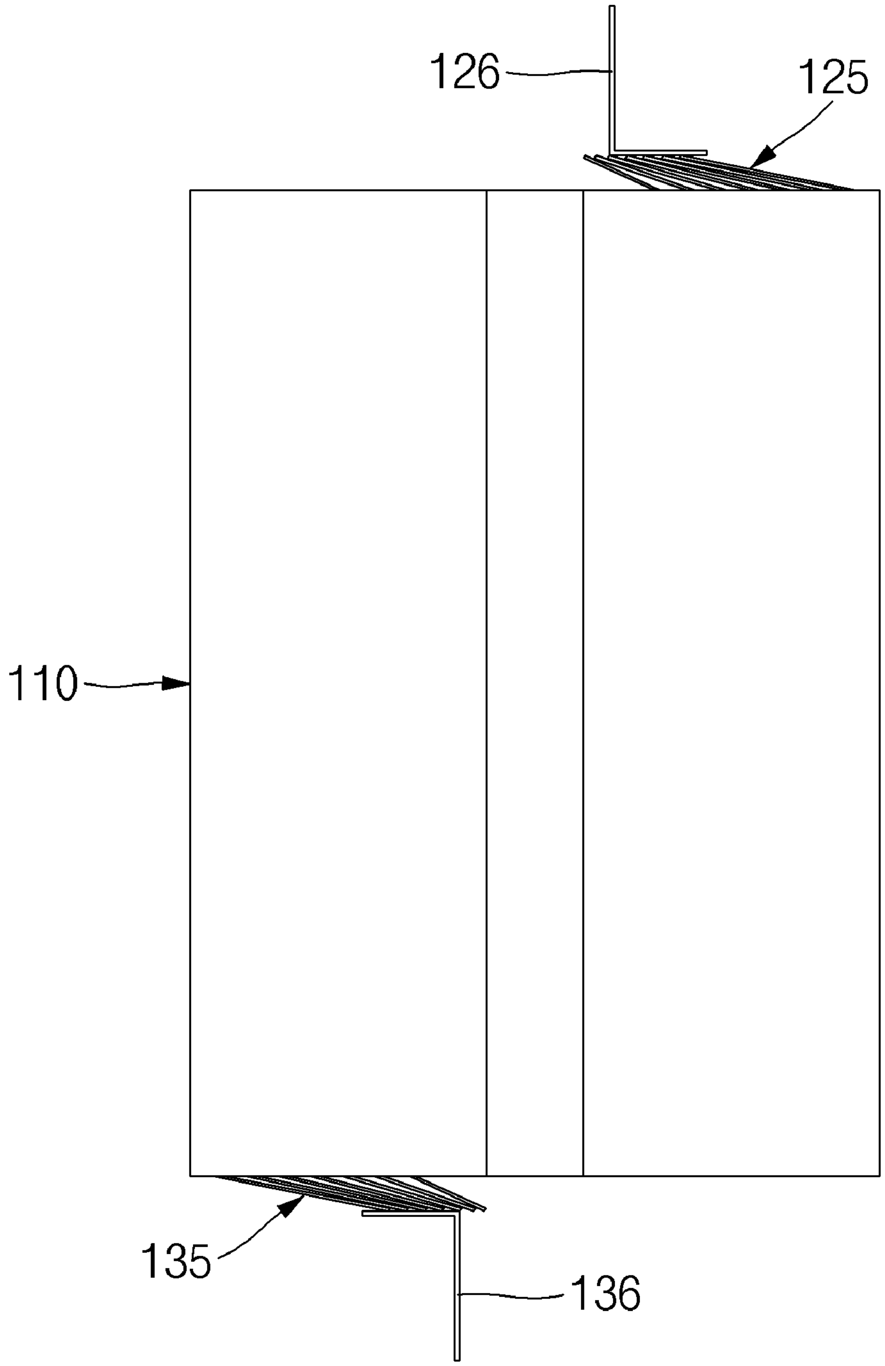

FIGS. 5A to 5C are diagrams illustrating a method for manufacturing an electrode assembly.

A method for manufacturing an electrode assembly will be briefly described with reference to FIGS. 5A to 5C. First, as shown in FIG. 5A, a laminate of the first electrode 120, the second electrode 130, and the separator 140 interposed between the first electrode 120 and the second electrode 130 is wound in a jelly-roll form. The first electrode tab structure 125 protrudes upward from the electrode assembly 110, and the second electrode tab structure 135 protrudes downward from the electrode assembly 110. In addition, the first electrode tab structure 125 is aligned in one direction at the top of the electrode assembly 110, and the second electrode tab structure 135 is aligned in the other direction at the bottom of the electrode assembly 110. In the first electrode tab structure 125 and the second electrode tab structure 135, the heights of the current collection parts may gradually increase from the center of the electrode assembly 110 to the outside.

Next, referring to FIG. 5B, the first electrode tab structure 125 and the second electrode tab structure 135 are bent toward the center of the electrode assembly 110. In some examples, a process of bending the first electrode tab structure 125 and the second electrode tab structure 135 may be referred to as a compaction process. The respective current collection parts of the first electrode tab structure 125 may overlap each other. The current collection parts located at the winding-front end in the first electrode tab structure 125 may have a height in which a region where the core was located (a hollow at the center of the electrode assembly) is not covered when winding the electrode assembly 110. In addition, the respective current collection parts of the second electrode tab structure 135 may overlap each other. The current collection parts located at the winding-front end in the second electrode tab structure 135 may have a height in which a region where the core was located (a hollow at the center of the electrode assembly) is not covered when winding the electrode assembly 110.

Next, referring to FIG. 5C, the first lead tab 126 is welded on the first electrode tab structure 125, and a second lead tab 136 is welded on the second electrode tab structure 135. One end of the first lead tab 126 may be welded to the overlapping first electrode tab structures 125 through a compaction process, and the other end may be bent and protrude upward from the electrode assembly 110. One end of the second lead tab 136 may be welded to the overlapping second electrode tab structure 135 through a compaction process, and the other end may be bent and protrude from the lower portion of the electrode assembly 110.

As described above, the secondary battery 100 according to the present invention includes a current collecting tab structure 125 including a plurality of current collection parts 1251, 1252, 1253, and 1254 and a lead tab 126 connecting the same, and thus a relatively high-cost current collector plate is not used, thereby reducing costs accordingly, and the inner space is highly utilized, thereby increasing the capacity of the secondary battery 100 relative to the same area.

The electrode assembly 110 is accommodated inside the case 150 together with an electrolyte. Here, the electrolyte is an organic liquid containing a salt so as to allow lithium ions to move between the first electrode 120 and the second electrode 130 constituting the electrode assembly 110. The electrolyte may include a non-aqueous organic electrolyte solution that is a mixture of a lithium salt such as $LiPF_6$, $LiBF_4$, or $LiClO_4$ and a high-purity organic solvent, but the present invention is not limited thereto.

In addition, a first insulating plate 115 may be interposed between the electrode assembly 110 and the cap assembly 160, and a second insulating plate 116 may be interposed between the electrode assembly 110 and the lower plate 152 of the case 150. The first insulating plate 115 may serve to prevent the electrode assembly 110 from electrically contacting the cap assembly 160. In particular, the first insulating plate 115 may prevent the second electrode 130 of the electrode assembly 110 from electrically contacting the cap assembly 160. A hole through which the first lead tab 126 passes and a hole through which the electrolyte or internal gas moves may be formed in the first insulating plate 115.

The second insulating plate 116 may serve to prevent the electrode assembly 110 from electrically contacting the lower plate 152 of the case 150. In particular, the second insulating plate 116 may prevent the first electrode 120 of the electrode assembly 110 from electrically contacting the lower plate 152 of the case 150. A hole through which the second lead tab 136 passes and a hole through which internal gas moves may be formed in the second insulating plate 116.

The case 150 may include a side plate 151 which is a cylindrical body having a certain diameter so as to form a space in which the electrode assembly 110 is accommodated, and a lower plate 152 sealing the lower part of the side plate 151. In some examples, case 150 may be referred to as a cylindrical case or a cylindrical can. A top opening of the case 150 is opened to seal after the electrode assembly 110 is inserted. In addition, a beading part 153 may be formed on an upper portion of the case 150 to prevent movement of the electrode assembly 110. In addition, a crimping part 154 for fixing the cap assembly 160 may be formed at a topmost portion of the case 150.

The cap assembly 160 may be positioned above the electrode assembly 110 and may be coupled to the top opening of the case 150 to seal the case 150. The cap assembly 160 may include a cap-up 161, a safety vent 162, an insulator 163, a cap-down 164, a sub plate 165, and a gasket 166.

The cap-up 161 has a convex top portion so as to be electrically connected to an external circuit. In addition, the cap-up 161 has a discharge hole 161*a* formed therein to provide a path through which the gas generated from the inside of the case 150 can be discharged. The cap-up 161 is electrically connected to the electrode assembly 110 and transfers current generated from the electrode assembly 110 to an external circuit.

The safety vent 162 is formed as a circular plate body corresponding to the cap-up 161. A protrusion 162*a* protruding downward is formed at the center of the safety vent 162. The protrusion 162*a* may be electrically connected to the sub plate 165 by passing through the through hole 164*a* of the cap-down 164. In addition, a notch 162*b* for guiding the rupture of the safety vent 162 is formed on the outer periphery of the protrusion 162*a*.

The outer periphery of the safety vent 162 is installed in close contact with the rest of the cap-up 161 except for the portion protruding upward. That is, the outer periphery of the safety vent 162 and the outer periphery of the cap-up 161 are in contact with each other. In addition, the edge of the safety vent 162 surrounds the cap-up 161 and extends to the top portion of the cap-up 161. The safety vent 162 discharges internal gas while blocking current when an abnormal internal pressure is generated inside the case 150. When the internal pressure of the case 150 exceeds an operating pressure of the safety vent 162, the safety vent 162 is electrically separated from the sub plate 165 while the protrusion 162*a* rises upward by the internal gas. In addition, the notch 162*b* of the safety vent 162 is ruptured when the internal pressure of the case 150 exceeds a rupture pressure higher than the operating pressure of the safety vent 162, thereby preventing the secondary battery 100 from exploding.

The insulator 163 is interposed between the safety vent 162 and the cap-down 164 to insulate the safety vent 162 and the cap-down 164. Specifically, the insulator 163 is interposed between the outer periphery of the safety vent 162 and the outer periphery of the cap-down 164. The insulator 163 may be formed of a resin material such as polyethylene (PE), polypropylene (PP), or polyethylene terephthalate (PET).

The cap-down 164 is formed as a circular plate body. A through hole 164*a* is formed in the center of the cap-down 164, and the protrusion 162*a* of the safety vent 162 passes through the through hole 164*a*. In addition, a discharge hole 164*b* is formed on one side of the cap-down 164, and a sub-plate 165 is coupled to a lower portion of the cap-down 164. The discharge hole 164*b* may discharge internal gas.

The sub plate 165 is welded between the protrusion 162*a* of the safety vent 162 and the first lead tab 126. Accordingly, the sub plate 165 electrically connects the first lead tab 126 and the safety vent 162.

The gasket 166 is installed in the top opening of the case 150. That is, the gasket 166 is assembled in close contact between the cap-up 161, the outer periphery of the safety vent 162, and the top opening of the case 150. The gasket 166 may be made of a resin material such as polyethylene (PE), polypropylene (PP), or polyethylene terephthalate (PET). The gasket 166 may prevent the cap assembly 160 from being separated from the case 150.

Figure 6:
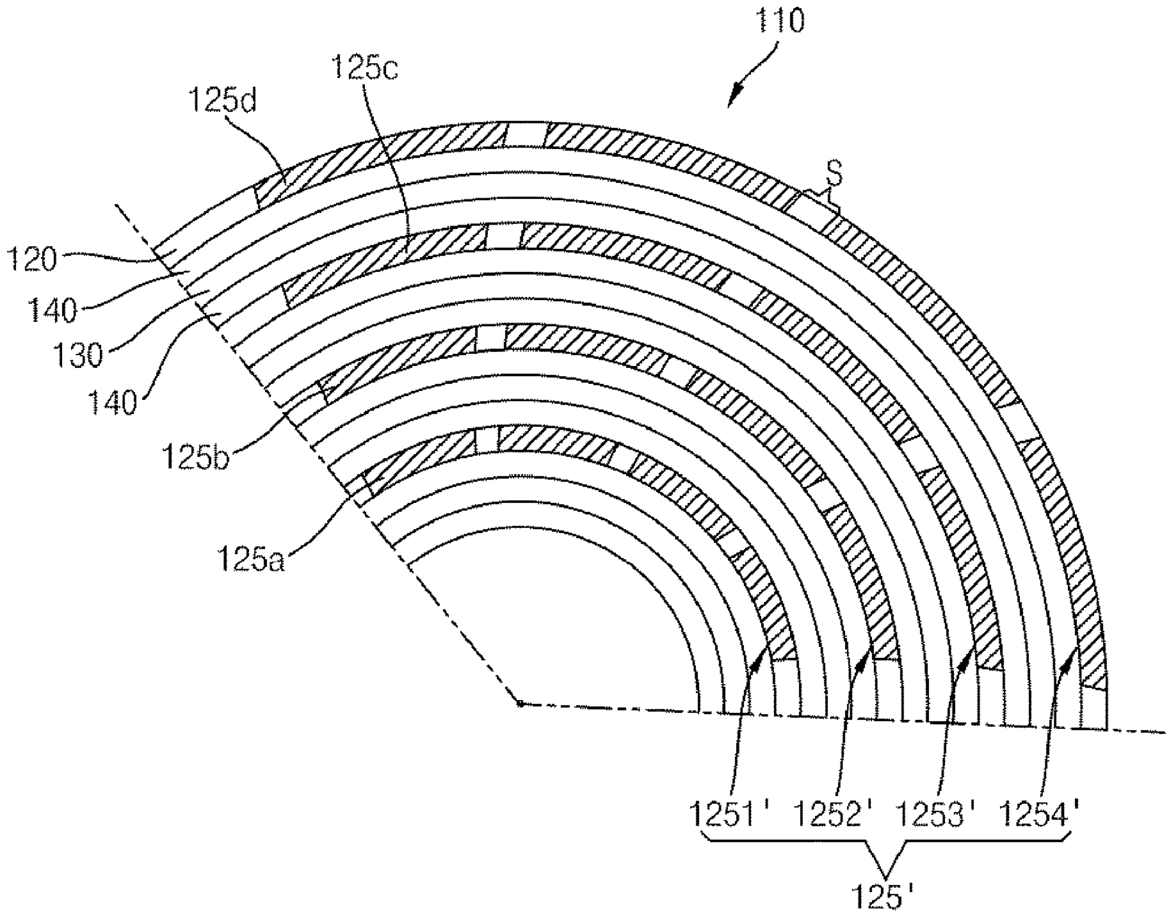
FIG. 6 is a plan view illustrating an electrode assembly according to another embodiment of the present invention.

FIG. 6 is a plan view illustrating an electrode assembly according to another embodiment of the present invention.

Referring to FIG. 6, the electrode assembly 100 may be wound such that current collection parts 1251', 1252', 1253', and 1254' of the first current collecting tab structure 125' are aligned in an oblique line. In other words, a slit s between each of the current collecting tabs 125*a*, 125*b*, 125*c*, and 125*d* spaced apart from each other may have a curved shape. The second current collection part 1252' may partially overlap the first current collection part 1251', the third current collection part 1253' may partially overlap the second current collection part 1252', and the fourth current collection part 1254' may partially overlap the third current collection part 1253'.

While the foregoing embodiment has been provided for carrying out the secondary battery according to the present invention, it should be understood that the embodiment described herein should be considered in a descriptive sense only and not for purposes of limitation, and various changes in form and details may be made therein without departing from the spirit and scope of the invention as defined by the following claims.

The invention claimed is:

1. A secondary battery comprising:

an electrode assembly including a first electrode, a second electrode, and a separator wound in a jelly roll configuration;

a case accommodating the electrode assembly; and a cap assembly coupled to the upper portion of the case, wherein the first electrode comprises: a first current collector; a first current collecting tab structure extending from the first current collector and having a plurality of bent current collection parts; and a first lead tab electrically connected to the first current collecting tab structure, wherein, in the first current collecting tab structure, the width of the current collection parts increases from a center of the electrode assembly to an outside of the electrode assembly, and the distance between the current collection parts increases, and wherein each of the current collection parts comprises a plurality of current collecting tabs.

2. The secondary battery of claim 1, wherein in the first current collecting tab structure, the height of the current collection part increases toward the outside from the center of the electrode assembly.

3. The secondary battery of claim 1, wherein the current collection part is bent toward the center of the electrode assembly.

4. The secondary battery of claim 1, wherein in the first current collecting tab structure, the current collection parts are arranged in a straight line and have a fan shape.

5. The secondary battery of claim 4, wherein an angle formed by the first current collecting tab structure with respect to the center of the electrode assembly is 90 degrees to 180 degrees.

6. The secondary battery of claim 1, wherein in the first current collecting tab structure, the current collection parts are arranged diagonally.

7. The secondary battery of claim 1, wherein the first lead tab is electrically connected to the cap assembly.

8. The secondary battery of claim 1, wherein the second electrode may include a second current collector, a second current collecting tab structure having a plurality of current collection parts extended from and bent from the second collector, and a second lead tab electrically connected to the second current collecting tab structure, and in the second current collecting tab structure, the widths of the current collection parts may increase, the heights of the current collection parts may increase, and the distance between the current collection parts may increase from the center of the electrode assembly to the outside.

9. The secondary battery of claim 8, wherein the second lead tab may be electrically connected to the case.

* * * * *